United States Patent Office 2,865,880
Patented Dec. 23, 1958

2,865,880

FIBERS COMPRISING ACRYLONITRILE POLYMERS CONTAINING ALUMINUM AND SILICON OXIDES

John R. Caldwell, Kingsport, Tenn., assignor to Eastman Kodak Company, Rochester, N. Y., a corporation of New Jersey No Drawing. Application April 7, 1954
Serial No. 421,681

6 Claims. (Cl. 260—41)

This invention relates to acrylonitrile polymer compositions and more particularly to acrylontirile polymer compositions, containing aluminum and silicon oxides in a colloidal state of dispersion, from which shaped articles such as synthetic fibers having improved dyeing properties can be formed.

An object of the invention is to provide acrylonitrile polymer fibers that have improved dyeing properties. Another object of the invention is to provide acrylonitrile polymer fibers having an improved ironing temperature or hot bar sticking temperature. A further object of the invention is to provide a method for incorporating colloidal aluminum and silicon oxides in acrylonitrile polymers. Another object of the invention is to provide a method for preparing acrylonitrile polymer fibers that contain colloidal aluminum and silicon oxides dispersed uniformly throughout the cross-section. Other objects will appear hereinafter.

In accordance with the present invention, these and other objects are attained by polymerizing acrylonitrile, alone or with other monomers, in an aqueous suspension of mixed aluminum and silicon oxides that have been freshly precipitated. Under the conditions of polymerization the oxides retain their colloidal form and surface activity to a large extent throughout the processes of isolating, dissolving, and spinning the polymer. Fibers containing from 8 to 15% of the colloidal oxides can be dyed to dark shades by ordinary procedures with cellulose acetate dyes, acid wool dyes, vat dyes, and some mordant dyes. Furthermore, the presence of the oxides raises the ironing temperature or hot bar sticking temperature of the fibers by 20 to 30° C.

I have also found that mixtures of colloidal aluminum and silicon oxides are valuable for use in accordance with my invention. The ratio of the oxides employed may lie in the range of 40 to 90% $Al_2O_3$ and the preferred range is 50 to 75% $Al_2O_3$. From 5 to 25% and preferably 8 to 15% of the mixed oxides are used, based on the weight of the acrylonitrile polymer.

In order to have a suitable affinity for dyes, it is important that the oxides be precipitated in a colloidal form that has a high degree of surface activity. This is accomplished by precipitating the oxides from relatively dilute solutions. The oxides are conveniently precipitated by mixing aqueous solutions of a water-soluble aluminum salt and sodium silicate. The pH is then adjusted to a value of about 4 to 7 by the addition of alkali or acid, as required. The chloride, sulfate, nitrate, or acetate of aluminum is suitable.

Polyacrylonitrile, or interpolymers of acrylonitrile with other monomers, may be employed in the process of my invention. Monomers that may be used in the preparation of interpolymers include: methyl acrylate, methyl methacrylate, vinyl acetate, isopropenyl acetate, vinyl chloride, methallyl alcohol, itaconic esters, and allyl esters. A particularly valuable class of interpolymers is derived from unsaturated amides as represented by: acrylamide, methacrylamide, N-methyl acrylamide, N,N-dimethyl acrylamide, N-methyl methacrylamide, etc. In general, any fiber-forming polymer of acrylonitrile may be employed in accordance with the invention.

Surface active agents such as fatty alcohol sulfates, aromatic sulfonates, sulfosuccinic esters, soaps, etc., may be used while forming the composition. Ethylene oxide condensation products are useful as dispersing agents.

Peroxide catalysts such as sodium persulfate, hydrogen peroxide, perborates, etc., are used. Regulators and promoters such as sodium bisulfite, dodecyl mercaptan, amyl mercaptan, etc., may be employed for the polymerization.

The polymer products containing the specified oxides separate from the reaction medium as granular precipitates that are readily filtered and washed.

The products are soluble in the usual acrylonitrile polymer solvents such as dimethylformamide, dimethyl acetamide, ethylene carbonate, gamma-butyrolactone, ethylene cyanohydrin, etc. The solutions are usually cloudy or turbid because of the colloidal oxides. However, the particle size is so small that the solutions can be filtered and spun by the ordinary methods.

Various well-known wet and dry spinning methods can be employed with my novel spinning solutions. The wet or dry spinning methods described in Emmett V. Martin, U. S. application Ser. No. 159,089, filed April 29, 1950, now Patent 2,697,023 of December 14, 1954 for "Improvement in Spinning Acrylonitrile" also may be employed to spin the spinning compositions of the present invention. The resulting fibers have a high tensile strength and improved elastic properties.

The following dyes are among those which can be employed to color the fibers of the present invention:

Cellulose acetate dyes:
  Eastman Blue BGF
  Eastman Blue BNN
  Eastman Fast Violet 5RLF
  Eastman Fast Yellow GLF
  Eastone Scarlet BG
  Eastone Orange 3R

|  | Color index number |
|---|---|
| Acid wool dyes: |  |
| Brilliant Milling Blue BA | 37 |
| Brilliant Milling Red RA | 487 |
| Brilliant Milling Green B | 667 |
| Brilliant Milling Yellow 6G | 138 |
| Fast Light Yellow R | 636 |
| Scarlet 4RA | 135 |
| Xylene Milling Black B | 304 |
| Vat dyes: |  |
| Ponsol Jade Green | 1101 |
| Ponsol Navy Blue RA | 1100 |
| Ponsol Red BND | 1162 |
| Ponsol Violet RRD | 1104 |
| Ponsol Yellow 3R | 452 |
| Sulfanthrene Brown GR | 121 |
| Mordant dyes: |  |
| Omega Chrome Brown 2R | 98 |
| Omega Chrome Dark Violet D | 169 |
| Omega Chrome Orange G | 274 |
| Omega Chrome Red B | 652 |
| Omega Chrome Yellow 3G | 52 |
| Omega Chrome Black P | 204 |

These cellulose acetate dyes, wool dyes, vat dyes, and mordant dyes may be applied to the fibers by the method shown in Diserens, Louis, Chemistry and Technology of Dyeing and Printing, New York, The Reinhold Corporation, vol. I (1948), vol. II (1951), translated from the second German edition.

The present invention is further illustrated in the following examples:

*Example 1.*—Four and one-half grams of $$Na_2SiO_3 \cdot 9H_2O$$

is dissolved in 300 cc. water and the solution is mixed with 3.0 g. $AlCl_3 \cdot 6H_2O$ in 50 cc. water. A gelatinous precipitate of colloidal $Al_2O_3$ and $SiO_2$ is formed. The following ingredients are added:

23.0 g. acrylonitrile
2.0 g. isopropenyl acetate
0.3 g. potassium persulfate
0.2 g. dodecyl mercaptan The mixture is stirred at 50° C. for 16 hours. The precipitated polymer is filtered, washed, and dried. It is soluble in dimethyl acetamide, dimethyl formamide, gamma-butyrolactone, and ethylene carbonate.

A spinning solution is prepared by dissolving 10 g. of the polymer in 60 cc. dimethylformamide. The solution is filtered and extruded through a multihole spinneret into a coagulating bath consisting of 75% water–25% dimethylformamide. The filaments are washed, dried, and drafted 600% at an elevated temperature. The yarn has a strength of 2.5 grams per denier and elongation of 20–24%. It has an ironing temperature or hot bar sticking temperature of 220–230° C.

The fibers can be dyed to dark shades with cellulose acetate dyes, acid wool dyes, and vat dyes mentioned herein.

*Example 2.*—Six grams $AlCl_3 \cdot 6H_2O$ is dissolved in 300 cc. water. A solution of 3 g. $Na_2CO_3$ and 4 g. $Na_2SiO_3 \cdot 9H_2O$ in 50 cc. water is added with stirring. A gelatinous precipitate of $Al_2O_3$ and $SiO_2$ is formed. The following materials are added to the suspension:

23.0 g. acrylonitrile
2.0 g. N-methyl methacrylamide
0.3 g. potassium persulfate
0.2 g. sodium bisulfite
0.3 g. dodecyl mercaptan
0.5 g. sulfonated mineral oil The mixture is stirred at 55–60° C. for 3 hours. The precipitated polymer is filtered, washed, and dried. The yield is 26 g.

The polymer is soluble in dimethylformamide, dimethyl acetamide, and gamma-butyrolactone. A solution in butyrolactone is spun by extruding into a heated air cabinet. After drafting, the fibers have a strength of 2.5 to 3.0 grams per denier and an elongation of 20–26%. They dye to dark shades with cellulose acetate dyes, acid wool dyes, and vat dyes. They have a hot bar sticking temperature of 230–240° C.

*Example 3.*—Six grams $AlCl_3 \cdot 6H_2O$ is dissolved in 300 cc. water. A solution of 3 g. $Na_2CO_3$ and 4 g. $Na_2SiO_3 \cdot 9H_2O$ in 50 cc. water is added with stirring. A gelatinous precipitate of $Al_2O_3$ and $SiO_2$ is formed. The following materials are added to the suspension:

23.0 g. acrylonitrile
3.0 g. of N-isopropyl acrylamide
0.3 g. potassium persulfate
0.2 g. sodium bisulfite
0.3 g. dodecyl mercaptan
0.5 g. sulfonated mineral oil The mixture is stirred at 55–60° C. for 3 hours. The precipitated polymer is filtered, washed, and dried. The yield is 26 g.

The polymer is soluble in dimethylformamide, dimethyl acetamide, and gamma-butyrolactone. A solution in butyrolactone is spun by extruding into a heated air cabinet. After drafting, the fibers have a strength of 2.5 to 3.0 grams per denier and an elongation of 20–26%. They dye to dark shades with cellulose acetate dyes, acid wool dyes, and vat dyes. They have a hot bar sticking temperature of 230–240° C.

*Example 4.*—Eight grams of $Na_2SiO_3 \cdot 9H_2O$ is dissolved in 300 cc. water. A solution of 3 g. $AlCl_3 \cdot 6H_2O$ in 50 cc. water is added. The pH of the solution is then adjusted to 4–6 by the addition of dilute hydrochloric acid. A colloidal precipitate of $Al_2O_3$ and $SiO_2$ is formed. The following materials are added:

25.0 g. acrylonitrile
0.2 g. potassium persulfate
0.3 g. dodecyl mercaptan
0.5 g. sulfated fatty alcohol The mixture is stirred at 50–55° C. for 8 hours. The product is filtered, washed, and dried.

The polymer gives fibers that dye well with cellulose acetate dyes, acid wool dyes, and vat dyes.

*Example 5.*—Twelve grams $AlCl_3 \cdot 6H_2O$ is dissolved in 350 cc. water. A solution of 4 g. $Na_2SiO_3 \cdot 9H_2O$ and 5 g. $Na_2CO_3$ in 50 cc. water is added with stirring. The pH of the suspension is then adjusted to 4–6 by the addition of sodium carbonate solution. The following materials are added:

21.0 g. acrylonitrile
4.0 g. vinyl acetate
0.3 g. potassium persulfate
0.2 g. dodecyl mercaptan
0.4 g. fatty alcohol sulfate The mixture is stirred at 50–55° C. for 12 hours. The product gives fibers that dye well with cellulose acetate dyes, vat dyes, and acid wool dyes. The fibers stick to the hot bar at 200–210 C.

*Example 6.*—Twelve grams $AlCl_3 \cdot 6H_2O$ is dissolved in 350 cc. water. A solution of 4 g. $Na_2SiO_3 \cdot 9H_2O$ and 5 g. $Na_2CO_3$ in 50 cc. water is added with stirring. The pH of the suspension is then adjusted to 4–6 by the addition of sodium carbonate solution. The following materials are added:

21.0 g. acrylonitrile
4.0 g. N,N-diethyl acrylamide
0.3 g. potassium persulfate
0.2 g. dodecyl mercaptan
0.4 g. fatty alcohol sulfate The mixture is stirred at 50–55° C. for 12 hours. The product gives fibers that dye well with cellulose acetate dyes, vat dyes, and acid wool dyes. The fibers stick to the hot bar at 200–210° C.

My present invention represents a new approach to the problem of improving the dyeing properties of acrylonitrile polymer fibers. Previous methods have all been based on the use of organic modifiers employed in copolymers, graft polymers or mixtures. My present method depends upon inorganic modifiers which have a highly active surface with a large capacity for absorption. Furthermore, employing the aluminum and silicon oxides permit a considerable economic advantage over most compounds such as acrylamides.

I claim:

1. Fibers having improved dyeing and sticking characteristics made from an acyclic acrylonitrile polymer composition selected from the group consisting of acrylonitrile, N-methyl methacrylamide copolymer; acrylonitrile, N-isopropyl acrylamide copolymer; polyacrylonitrile; acrylonitrile, vinyl acetate copolymer; and acrylonitrile, N,N-diethyl acrylamide copolymer and containing $Al_2O_3$ and $SiO_2$ in colloidal form in an amount within the range of 8 to 15% by weight of the polymer the $Al_2O_3$ being present in an amount of 50 to 75% of the total oxide mixture.

2. Fibers having improved dyeing and heat sticking characteristics made from an acrylonitrile N-methyl methacrylamide copolymer composition containing $Al_2O_3$ and $SiO_2$ in colloidal form in an amount within the range of 8 to 15% by weight of the copolymer the $Al_2O_3$ being present in an amount of 50 to 75% of the total oxide mixture.

3. Fibers having improved dyeing and heat sticking characteristics made from an acrylonitrile N-isopropyl acrylamide copolymer composition containing $Al_2O_3$ and $SiO_2$ in colloidal form in an amount within the range of 8 to 15% by weight of the copolymer the $Al_2O_3$ being present in an amount of 50 to 75% of the total oxide mixture.

4. Fibers having improved dyeing and heat sticking characteristics made from polyacrylonitrile composition containing $Al_2O_3$ and $SiO_2$ in colloidal form in an amount within the range of 8 to 15% by weight of the copolymer the $Al_2O_3$ being present in an amount of 50 to 75% of the total oxide mixture.

5. Fibers having improved dyeing and heat sticking characteristics made from acrylonitrile vinyl acetate copolymer composition containing $Al_2O_3$ and $SiO_2$ in colloidal form in an amount within the range of 8 to 15% by weight of the copolymer the $Al_2O_3$ being present in an amount of 50 to 75% of the total oxide mixture.

6. Fibers having improved dyeing and heat sticking characteristics made from acrylonitrile N,N-diethyl acrylamide copolymer composition containing $Al_2O_3$ and $SiO_2$ in colloidal form in an amount within the range of 8 to 15% by weight of the copolymer the $Al_2O_3$ being present in an amount of 50 to 75% of the total oxide mixture.

References Cited in the file of this patent

UNITED STATES PATENTS

| 2,467,339 | Seymour | Apr. 12, 1949 |

FOREIGN PATENTS

| 675,627 | Great Britain | July 16, 1952 |